(12) United States Patent
Schmid et al.

(10) Patent No.: US 9,074,657 B2
(45) Date of Patent: Jul. 7, 2015

(54) TENSIONING SYSTEM WITH RESTORING ACTION

(75) Inventors: Tobias Schmid, Bronnen (DE); Christian Bauer, Munich (DE); Renzo Perissinotto, Dachau (DE)

(73) Assignee: IWIS MOTORSYSTEME GMBH & CO., KG, Munich (DE)

( * ) Notice: Subject to any disclaimer, the term of this patent is extended or adjusted under 35 U.S.C. 154(b) by 353 days.

(21) Appl. No.: 13/703,580

(22) PCT Filed: Mar. 25, 2011

(86) PCT No.: PCT/EP2011/001515
§ 371 (c)(1),
(2), (4) Date: Feb. 4, 2013

(87) PCT Pub. No.: WO2011/154065
PCT Pub. Date: Dec. 15, 2011

(65) Prior Publication Data
US 2013/0203534 A1  Aug. 8, 2013

(30) Foreign Application Priority Data

Jun. 11, 2010 (EP) ..................................... 10006086
Jun. 25, 2010 (EP) ..................................... 10006627

(51) Int. Cl.
*F16H 7/08* (2006.01)

(52) U.S. Cl.
CPC ................ *F16H 7/08* (2013.01); *F16H 7/0836* (2013.01); *F16H 7/0848* (2013.01);
(Continued)

(58) Field of Classification Search
CPC ................ F16H 2007/0855; F16H 2007/0806; F16H 7/0848
USPC .......................................... 474/101, 109, 110
See application file for complete search history.

(56) References Cited

U.S. PATENT DOCUMENTS 4,792,322 A * 12/1988 Goppelt et al. ................ 474/136
5,931,754 A *  8/1999 Stief et al. ..................... 474/109
(Continued)

FOREIGN PATENT DOCUMENTS

CN   101248295 A    8/2008
CN   101566220 A   10/2009
(Continued)

*Primary Examiner* — Michael Mansen
*Assistant Examiner* — Michael Riegelman
(74) *Attorney, Agent, or Firm* — Baker and Hostetler LLP

(57) ABSTRACT

A tensioning system with restoring action for tensioning a flexible drive means is provided, in particular a drive chain of an internal combustion engine, composed of a tensioning apparatus and a restoring device. The tensioning apparatus comprises a housing, a tensioning piston which is guided in a movable manner in the housing and which has a detent profiling, and a detent hook for the stepped adjustment of the working range of the tensioning piston, wherein the detent hook has a clamping region for engaging into the detent profiling in the tensioning piston. Here, a retraction stop is provided at the housing, at which retraction stop, in an abutting state of the detent hook, a further retraction movement of the tensioning piston into the housing is prevented by virtue of the clamping region being clamped on the detent profiling. The restoring device has a restoring element which is separate from the tensioning apparatus and which is received in a restoring receptacle of the tensioning apparatus and which prevents the abutment of the detent hook against the retraction stop and which, in the event of abutment of the detent hook against the restoring element and a further retraction movement of the tensioning piston, causes the clamping region to spread open and permits a restoring movement of the tensioning piston. The present system also relates to a corresponding tensioning apparatus having a restoring receptacle for receiving the restoring element.

14 Claims, 5 Drawing Sheets

(52) U.S. Cl.
CPC .............. *F16H 2007/0806* (2013.01); *F16H 2007/0853* (2013.01); *F16H 2007/0855* (2013.01); *F16H 2007/0878* (2013.01); *F16H 2007/0891* (2013.01)

(56) References Cited

U.S. PATENT DOCUMENTS

| | | | |
|---|---|---|---|
| 5,989,139 | A | 11/1999 | Dusinberre, II et al. |
| 6,120,402 | A * | 9/2000 | Preston et al. ............... 474/109 |
| 6,126,563 | A | 10/2000 | Simpson |
| 6,244,981 | B1 * | 6/2001 | Simpson ..................... 474/110 |
| 7,455,607 | B2 | 11/2008 | Narita et al. |
| 7,559,863 | B2 * | 7/2009 | Onimaru et al. ............. 474/110 |
| 8,262,521 | B2 | 9/2012 | Bauer et al. |
| 8,888,624 | B2 * | 11/2014 | Bauer et al. .................. 474/110 |
| 2002/0094894 | A1 * | 7/2002 | Poiret et al. ................. 474/101 |
| 2003/0139235 | A1 * | 7/2003 | Yamamoto et al. .......... 474/109 |
| 2004/0266571 | A1 * | 12/2004 | Izutsu et al. ................. 474/110 |
| 2006/0094548 | A1 * | 5/2006 | Sato et al. ................... 474/109 |
| 2006/0281595 | A1 | 12/2006 | Narita et al. |
| 2008/0248906 | A1 | 10/2008 | Ullein |
| 2010/0222167 | A1 * | 9/2010 | Chekansky et al. .......... 474/110 |

FOREIGN PATENT DOCUMENTS

| | | |
|---|---|---|
| DE | 10014700 A1 | 10/2001 |
| DE | 19680418 C1 | 11/2001 |
| DE | 202007008985 U1 | 12/2008 |
| EP | 2131066 A2 | 12/2009 |
| JP | 2006348975 A | 12/2006 |
| WO | 96/41975 A1 | 12/1996 |
| WO | 2009/000354 A1 | 12/2008 |

* cited by examiner

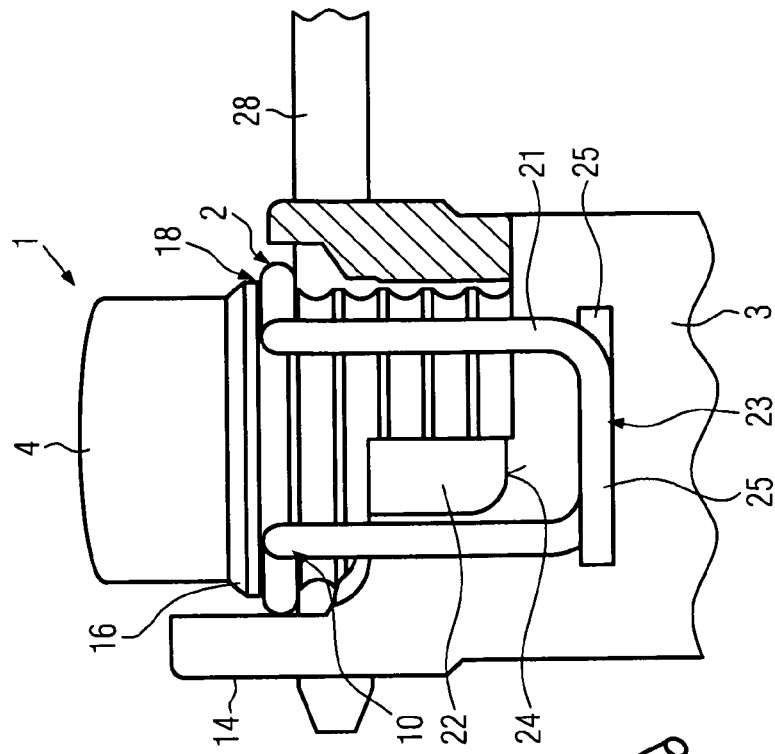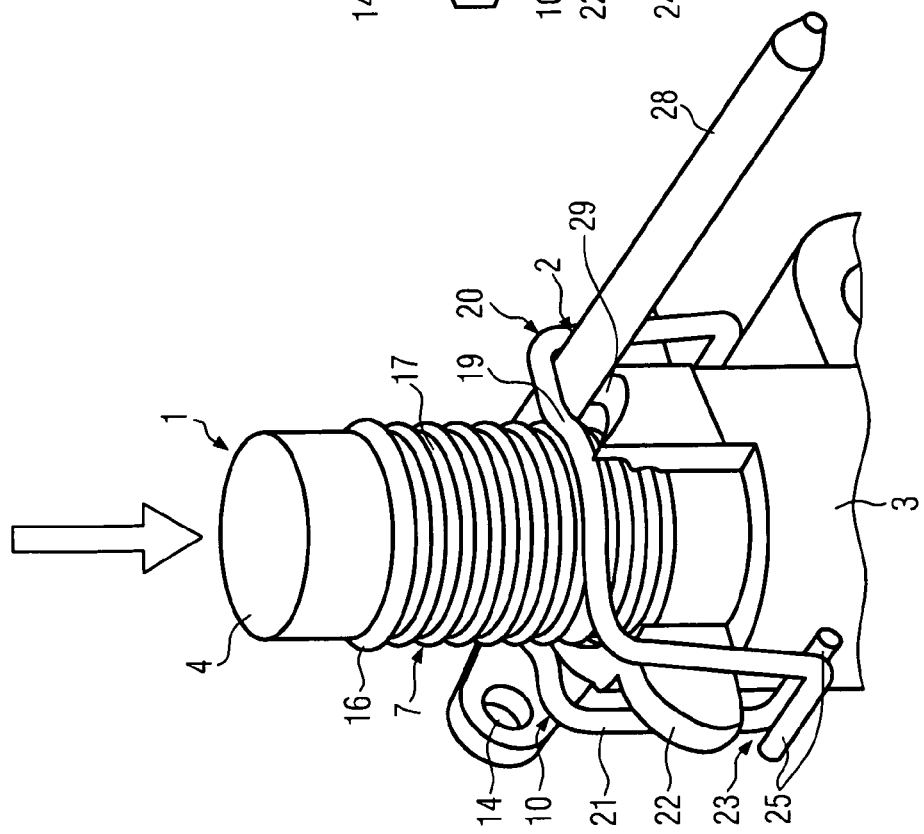
FIG. 4b
FIG. 4a

TENSIONING SYSTEM WITH RESTORING ACTION

CROSS-REFERENCE TO RELATED APPLICATIONS

This application is a National Stage of International patent application PCT/EP2011/001515, filed on Mar. 25, 2011, which claims priority to foreign European patent application No. EP 10006086.2, filed on Jun. 11, 2010, and foreign European patent application No. EP 10006627.3, filed on Jun. 25, 2010, the disclosures of which are incorporated by reference in their entirety.

FIELD OF THE INVENTION

The present invention relates to a tensioning system with restoring action for tensioning a flexible drive means, in particular a drive chain of an internal combustion engine, composed of a tensioning apparatus and a restoring device. The tensioning apparatus comprises a housing, a tensioning piston which is guided in a movable manner in tensioning direction in the housing and which has a detent profiling, and a detent hook for the stepped adjustment of the working range of the tensioning piston, wherein the detent hook has a clamping region for engaging into the detent profiling at the tensioning piston. In addition, a retraction stop is provided at the housing in such a manner that in an abutting state of the detent hook, a further retraction movement of the tensioning piston into the housing is prevented by virtue of the clamping region being clamped on the detent profiling. The present invention also relates to a corresponding tensioning apparatus.

BACKGROUND

Tensioning apparatuses with actuated pistons having adjustment devices are widespread in prior art and among others used in timing chain drives in internal combustion engines. In that context, the housing forms a pressure chamber in combination with a hollow cylindrical tensioning piston in the piston bore of the housing which is typically filled with a hydraulic medium under pressure and holds a compression spring in order to mechanically pretension the tensioning piston. The adjustment functions of such tensioning apparatuses frequently have detent mechanisms which define a blocking and a sliding direction for the tensioning piston, wherein excessive retracting of the tensioning piston into the housing is prevented by means of a stop while an adjustment of the working range of the tensioning piston is facilitated. For example, such a tensioning apparatus with a simple detent mechanism has been established in DE 190 14 700 A1, wherein the tensioning piston is equipped with a sawtooth profiling into which a ratchet block engages through a window cutout in the housing. In this tensioning apparatus, the free working range of the tensioning piston is limited by the axial freedom of movement of the ratchet block in the housing window.

Another established concept of a tensioning apparatus with adjustment function is disclosed in DE 196 80 418 C1. In that context, the tensioning piston of this hydraulic tensioner has several circumferential detent grooves engaged by the circular clamping section of a detent hook. A stop ring embedded in the housing bore is provided for the realization of the adjustment function at the tension-side end of the piston bore while the blocking of the tensioning piston is realized via a beveled stop surface formed in the housing. A working range sufficient for the tensioning apparatus to develop its damping effect is located in between. In addition to the two clamping sections of the circular clamping region, the detent hook has a U-shaped section and two end legs, each radially extending from the clamping section to the outside and moving in the working range of the tensioning piston in corresponding housing windows between the lower stop surface and the upper stop ring. When adjusting the working range, the detent hook is in an abutting state at the upper stop ring, causing a tensioning piston extending further from the housing to radially spread open the circular section of the detent hook and push the detent hook into the next detent groove of the tensioning piston. If the circular clamping section of the detent hook is in an abutting state at the lower beveled stop surface during a retraction movement of the tensioning piston, the clamping sections of the detent hook will be pressed into the respective detent groove and the further retraction movement of the tensioning piston into the housing will be blocked.

Publication U.S. Pat. No. 7,455,607 B1 describes a generic tensioning system with restoring action, wherein the tensioning piston axially guided in the piston bore of a tensioner housing has a circumferential channel profile holding a detent ring. This detent ring has an essentially closed circular clamping region with two crossing arms which laterally protrude from the ring section through an opening in the housing. A wide circumferential groove in the piston bore of the housing defines the free duty stroke of the tensioning piston towards the detent ring radially protruding at the tensioning piston, respectively forming an upper and a lower stop, wherein the lower stop flank is tilted to clamp the clamping region on the channels of the tensioning piston. The clamping effect of the detent ring on the tensioning piston may be canceled via the arms of the detent ring radially protruding at the housing by compressing the end sections of the arms at the designated handles in order to facilitate restoring the tensioning piston to its original position by stretching open the clamping region, i.e. preventing blocking of the detent ring at the lower stop by stretching open the clamping region from the outside and permitting the tensioning piston to slide into the housing bore without resistance.

Tensioning apparatuses with adjustment devices and a limitation of the retraction movement of a tensioning piston into a housing with a simultaneous definition of the free duty stroke of the tensioning piston are common in different prior art concepts and embodiments and have proven successful in use. Unfortunately, blocking the retraction movement of the tensioning piston is disadvantageous, both during the final assembly of the tensioning systems and particularly during disassembly and subsequent re-installation of the tensioning apparatus during maintenance or service, and for simple tensioning apparatuses sometimes requires the replacement of the tensioning system. This is why there is the requirement to facilitate restoring the tensioning piston, especially for modern tensioning systems with adjustment and blocking devices. However, as the restoring action of the tensioning piston generally opposes the blocking function of the adjustment device, this results in a complex design with additional parts and an individual shape of the required components for most established tensioning apparatuses.

This is why the problem of providing a tensioning system with restoring action for tensioning a flexible drive means, the design of which facilitates a configuration which is as simple as possible and simple handling of a restoring device while also ensuring a reliable function of the adjustment device, is the basis of the present invention.

SUMMARY OF THE INVENTION

According to the invention, this problem is solved in a generic tensioning system with restoring action by the restoring device having a restoring element which may be functionally coupled to the tensioning apparatus, wherein the restoring element brought into the restoring position prevents the abutting state of the detent hook at the retraction stop and the restoring device is designed in such a manner that it is possible for the clamping region to be automatically spread open and for the tensioning piston to be restored upon the detent hook being in an abutting state at the restoring element and a further retraction movement of the tensioning piston into the housing.

The embodiment of a tensioning system with restoring action as described in the invention facilitates restoring the tensioning piston in a simple, nondestructive manner by means of the restoring element which may be functionally coupled to the tensioning apparatus. In that context, the receptacle of the restoring element in the tensioning apparatus prevents the abutting state of the detent hook at the lower retraction stop which may have a tilted, beveled, or cone-shaped design and consequently also prevents the effect of the retraction stop on the detent hook. Here the retraction stop may be designed in such a manner that spreading open the clamping region is at least prevented in such a manner that the further retraction movement of the tensioning piston into the housing is suppressed. The retraction stop for blocking the retraction movement of the tensioning piston preferably effects the clamping region of the detent hook being pressed on the detent profiling of the tensioning piston. In addition, the tensioning apparatus is also shaped in such a manner that the restoring element which may be functionally coupled to the tensioning apparatus may be inserted into the tensioning apparatus from the outside with ease.

The restoring element which is arranged in the tensioning apparatus and may be functionally coupled to the tensioning apparatus does not just prevent the abutting state of the detent hook at the retraction stop and consequently the clamping of the clamping sections on the detent profile, but also facilitates the unobstructed opening of the clamping region of the detent hook at the restoring element upon a further retraction movement of the tensioning piston. In that context, the clamping region is laterally moved apart and/or spread open on a plane in such a manner that the tensioning piston may subsequently slide with its detent profiling through the spread open detent hook. In the tensioning system as described in the invention, the restoring device facilitates restoring the tensioning piston into a fully retracted position which supports reactivating a transport safety lock, for example in order to safely disassemble the tensioning apparatus.

A favorable embodiment provides for the detent profiling being formed at the tensioning piston in such a manner that it is possible to automatically spread open the clamping region when restoring the tensioning piston. When the clamping region is spread open by the detent profiling of the tensioning piston, it is possible to rely on the established reliable principle for adjusting the working range of the tensioning piston which, in addition to simple functionality without additional parts, constitutes an inexpensive solution. When restoring the tensioning piston at the restoring element, the tensioning piston is slid through the detent hook in a functionally similar manner by the clamping sections being laterally moved apart via the further engaging movement of the tensioning piston, facilitating the tensioning piston to slide through in order to restore the tensioning piston.

A restoring receptacle may be formed at the housing for a simple embodiment and simple manufacturing. The restoring receptacle may preferably have a support surface and optionally a safety projection protruding opposite the support surface in that context. In addition to a safety projection formed from the housing, the restoring element may also be secured via a skillful arrangement of other parts of the tensioning apparatus, for example the transport safety lock or the detent hook, in its position on the support surface of the restoring receptacle. The support surface which commonly is essentially perpendicular to the piston axis facilitates good support of the restoring element and a reliable alignment for the abutting state of the detent hook at the restoring element while the safety projection secures the restoring element in its position in the restoring receptacle. A safety projection protruding opposite the outer surface may be aligned essentially parallel to the piston axis and/or the tensioning direction of the tensioning piston in that context.

A suitable embodiment of the tensioning system with restoring action provides for the restoring element to have a pin shape and to be at least partially complementary to the restoring receptacle. A pin-shaped restoring element is a shape that is very simple and easy to handle for the purpose of arranging it from the outside in the restoring receptacle of a tensioning apparatus. An at least partially complementary shape, especially of the circumference of the restoring element, to the restoring receptacle not only simplifies the arrangement in the restoring receptacle, but also the positioning and securing of the restoring element in the restoring receptacle. Further, the tip of the restoring element preferably has a shape with at least one cone-shaped section in order to simplify inserting the restoring element into the restoring receptacle of the tensioning apparatus.

The detent hook may advantageously have a section that radially extends from the tensioning piston to the outside, wherein the section of the detent hook extending to the outside is in an abutting state at the restoring element when restoring the tensioning piston and facilitates spreading open the clamping region during a further retraction movement of the tensioning piston. The abutting state of a section of the detent hook that radially extends from the tensioning piston to the outside at the restoring element prevents unintentionally clamping the detent hook and consequently spreading open the clamping region in a reliable manner upon a further retraction movement of the tensioning piston. In addition, the section of the detent hook that extends to the outside prevents slipping or shifting of the parts relative to each other and facilitates a good force distribution and force transmission when the clamping region is spread open by the detent profiling at the tensioning piston.

A preferred embodiment provides for the clamping region of the detent hook to have two clamping sections and the section radially extending to the outside to be at least part of a U-shaped section of the detent hook which connects the clamping sections in a spring-elastic manner. Due to its spring-elastic connection via the U-shaped section of the detent hook, the two arc-shaped clamping sections of the circular clamping region facilitate a good clamping effect on the detent profiling of the tensioning piston. This design facilitates opening the clamping region of the detent hook in a consistent manner both when adjusting the working range of the tensioning piston and when restoring the tensioning piston. In that context, the U-shaped region spring-elastically connects the clamping sections to each other in such a manner that a fully reversible expansion of the clamping region takes place when laterally moving apart the clamping sections on a plane. The clamping sections of the detent hook advantageously have the shape of the tensioning piston, resulting in their close arrangement in the channels of the detent profiling, extending the parallel legs of the U-shaped part.

A special embodiment of the tensioning system with restoring action provides for the U-shaped section of the detent hook to have at least one angled part and the housing to have at least one guide projection that protrudes from the housing wall, wherein the guide projection axially guides the angled part of the U-shaped section of the detent hook and secures it against twisting in the working range of the tensioning piston. The at least one angled part of the U-shaped section facilitates a simple formation of a torsion region as part of the spring-elastic connection of the clamping sections in that context. The legs of the angled part which are formed as torsion bars are connected by the part of the U-shaped section radially extending to the outside to both clamping sections of the detent hook. The angled part of the U-shaped section of the detent hook essentially extends parallel or at a small angle to the piston axis outside the housing wall. It is insignificant in that context whether the actual distance of the angled part to the housing wall is equal across the angled region. The interaction with the angled part of the detent hook enables the guide projection protruding from the housing wall to axially and radially guide the detent hook in the working range of the tensioning piston. In that context, the circular part of the detent hook is clamped with the two arc-shaped clamping sections on the associated detent profiling of the piston, also coinciding with corresponding guidance of the tensioning piston by the detent hook.

In addition to good axial guidance of the detent hook and the tensioning piston, a preferred at least partial arrangement of the guide projection between the parallel legs of the angled part of the U-shaped section of the detent hook also facilitates good safeguarding against radial twisting in case of only very small permissible angles of rotation. The axial guidance and twisting protection of the detent hook and the tensioning piston facilitate dimensioning the necessary window cutouts for the working range of the tensioning piston independently from the sections of the detent hook that radially extend to the outside. In an advantageous embodiment, the guide projection has a stop at its rear end, the end in the opposite direction of the tensioning direction of the piston, which limits the axial movement of the detent hook in the disengaging direction by the bar of the U-shaped section which connects the legs of the angled part pushing the detent hook against that stop. In this context, the restoring receptacle for receiving the restoring element may be formed in the housing above the guide projection, i.e. at the tension-side end of the guide projection. As the angled part of the U-shaped section prevents losing the restoring element from the receptacle, additional safeguarding via a projection protruding opposite the support surface may be omitted.

In another embodiment, the detent hook has a second U-shaped section with an angled part, wherein the two U-shaped sections are arranged on opposite sides of the circular clamping region and two guide projections which protrude from the housing wall axially guide the angled parts of the U-shaped sections in the working range of the tensioning piston and secure the detent hook against twisting. The arrangement of the two U-shaped sections, with an angled part each, on the opposite side facilitates an even distribution of the occurring axial load of the detent hook and consequently results in a reduction of the risk of wear and the danger of tilting the tensioning piston. In addition, the axial movement of the detent hook in the disengaging movement may be limited by an abutting state of the bars of the U-shaped sections at the rear adjustment stops of the guide projections, facilitating the omission of additional stops.

It is possible to manufacture the detent hook from a round wire for an inexpensive and stable design. In addition to the relatively favorable material price for round wire, round wire may also be processed in a simple manner and achieves good dimensional stability with beneficial strength properties.

A practicable embodiment provides for the detent profiling to be formed as channel profile with multiple channels, ideally with circumferential detent channels, at the tensioning piston. The detent channels arranged on top of each other at the tensioning piston facilitate a simple, effective design of the detent profile. The distance of the detent channels at the tensioning piston may be less than twice the diameter of the detent channels for fine increments of the adjustment of the working range of the tensioning piston. The detent channels have slanted flanks on both sides which extend slanted to the tensioning direction and/or the bottom of the channels in order to spread open the clamping region of the detent hook when adjusting or restoring the tensioning piston via the disengaging or engaging movement of the tensioning piston and in that manner facilitate the tensioning piston to slide over. The flanks are formed symmetrically to the channel groves in order to facilitate consistent spreading open when adjusting the working range and when restoring the tensioning piston. The detent channels are shaped like segments of a circle in a special variation.

Another embodiment of the tensioning system provides for a transport safety lock with a safety pin, wherein at least one pin receptacle suitable for receiving the safety pin is available at the housing in order to keep the tensioning piston in a transport position. The safety pin inserted into the pin receptacle prevents unintentional disengaging of the tensioning piston during transport and the final assembly of the tensioning system. For reasons of simplification, the safety pin may also be usable as restoring element. This eliminates an additional special restoring element. In that context, it is only necessary to configure the restoring receptacle in accordance with the shape and the diameter of the safety pin and/or to facilitate receiving the safety pin in the restoring receptacle.

The present invention also relates to a tensioning apparatus for tensioning a flexible drive means with a housing, a tensioning piston which is guided in a movable manner in the housing and which has a detent profiling, and a detent hook for the stepped adjustment of the working range of the tensioning piston, wherein the detent hook has a clamping region for engaging into the detent profiling at the tensioning piston and a retraction stop is provided at the housing in such a manner that in an abutting state of the detent hook, a further retraction movement of the tensioning piston into the housing is prevented by virtue of the clamping region being clamped on the detent profiling, and wherein the tensioning apparatus has a restoring receptacle for receiving a restoring element in such a manner that automatically spreading open the clamping region and restoring the tensioning piston are facilitated upon an abutting state of the detent hook at the restoring element and a further retraction movement of the tensioning piston into the housing. The restoring receptacle facilitates the arrangement of a restoring element which may be functionally coupled to the tensioning apparatus in order to prevent an abutting state of the detent hook at the lower retraction stop and facilitate spreading open the clamping region of the detent hook. In that context, the restoring receptacle is formed in such a manner that it facilitates inserting as well as receiving a separate restoring element from the outside. The other embodiments of the tensioning apparatus in accordance with the invention correspond to the variations of the tensioning apparatus of the aforementioned tensioning system with restoring action.

BRIEF DESCRIPTION OF THE DRAWINGS

An exemplary embodiment of the invention is explained in more detail by means of a drawing below. The following are shown:

FIG. 4a A partial perspective view with cleared sections of the tensioning system from FIG. 1 with the arrangement of the restoring element in the restoring receptacle of the tensioning apparatus; and FIG. 4b A partial side view with cleared sections of the tensioning system from FIG. 4a with a restored tensioning piston.

DETAILED DESCRIPTION

Figure 1:
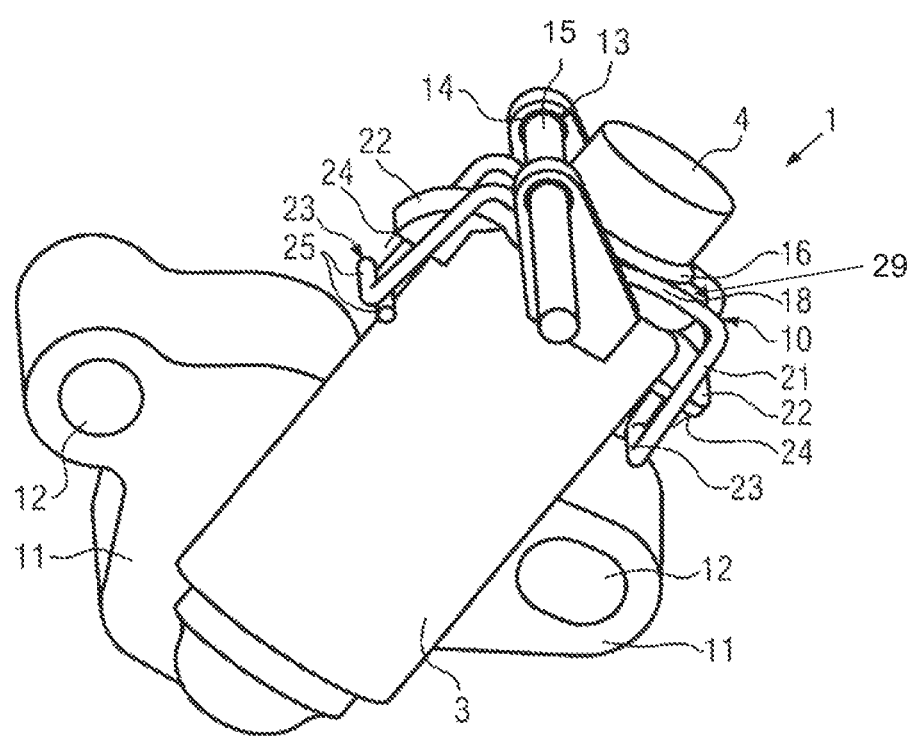
FIG. 1 A perspective view of a tensioning system with restoring action in accordance with the invention.

FIGS. 1 through 4 show a preferred embodiment of a tensioning system with restoring action with a tensioning apparatus 1 and a restoring device 2 in accordance with the invention. The tensioning apparatus 1 for tensioning a flexible drive means includes a hollow cylindrical housing 3 which is used to movably guide a tensioning piston 4 also having the shape of a hollow cylinder in longitudinal direction. The hollow cylindrical housing 3 and the tensioning piston 4 together form a pressure chamber 5. A filler 8 which limits the volume of the pressure chamber 5 is provided in the upper part of the hollow cylindrical tensioning piston 4 in that context. The tensioning piston 4 is pretensioned with a spiral compression spring 9 in axial direction and pushes against a flexible drive means that is not shown, in particular a drive chain of an internal combustion engine, in the direction of the axis of the tensioning piston 4. A vent bore is provided on the face side of the tensioning piston 4 in order to vent the pressure chamber 5 and provide a leakage flow of the hydraulic medium.

The housing 3 of the tensioning apparatus 1 shown here is realized as flange housing with lateral assembly flanges 11 and bolt holes 12 for the attachment of the tensioning apparatus 1 to an engine block. In addition, an embodiment of the housing 3 is also possible in the form of a screw housing characterized by the fact that the cylindrical housing body is furnished with an external thread.

A transport safety lock 13 consisting of two safety eyes 14 formed at projections of the housing 3 and a removable safety pin 15 that interacts with a safety projection 16 at the tensioning piston 4 in order to fasten the tensioning piston 4 in a transport position and hold the tensioning piston 4 fastened in a fully retracted position in the housing 3 in that context is also provided in tensioning direction at the front end of the housing 3. Here, the safety pin 15 guided and held in the safety eyes 14 is arranged above the safety projection 16 in such a manner opposite the tensioning piston 4 that the safety pin 15 overlaps with the safety projection 16 and prevents a disengagement of the tensioning piston 4 from the housing 3.

The adjustment device 6 of the tensioning apparatus 1 includes a detent profiling 7 with multiple circular grooves 17 shaped like segments of a circle in the cross-section at the tensioning piston 4 and a detent hook 10 that engages into these circular grooves 17 at the tensioning piston 4. The circular grooves 17 of the detent profiling 7 are formed on top of each other in tensioning direction at the front end of the tensioning piston 4 and start directly below the safety projection 16. In that context, the arc-shaped clamping sections 19 of the clamping region 18 of the detent hook 10 engage into the circular grooves 17 at the tensioning piston 4 and fasten the tensioning piston 4 via the pretensioning force of the clamping region 18 of the detent hook 10. Adjacent to the arc-shaped sections 19 of the clamping region 18, the detent hook 10 has two U-shaped sections 20 that are arranged at opposite sides of the clamping region 18. Starting from the arc-shaped sections 19 positioned in the circular grooves 17 of the tensioning piston 4, each U-shaped section 20 initially extends in a radial manner to the outside and then ends in an angled part 21, the two legs of which extend essentially parallel or with slight tilting to the housing wall of the hollow cylindrical housing 3 and are each axially guided by a guide projection 22 protruding from the housing wall of the housing 3 in that context. The parallel legs of the U-shaped sections 20 running in extension of the legs of the circular clamping region 18 shaped like segments of a circle are each arranged in the angled part 21 on a side of the guide projections 22, resulting in the angled part 21 of the U-shaped section 20 enclosing the guide projection 22 on three sides in this context. In this embodiment, the guide projection 22 is shaped as a slanted nose that is flattened at the end in tensioning direction and forms an adjustment stop 24 for the detent hook 10 at the end in the opposite direction of the tensioning direction. In this embodiment, the angled parts 21 of the U-shaped sections 20 of the detent hook 10 are slightly tilted toward the wall of the housing 3 which changes the distance to the housing 3 over the length of the angled parts 21. In that context, the angle between the parts of the U-shaped sections 20 radially extending to the outside and its angled parts 21 is approximately 90° to 100°. As the bars 23 at the lower ends of the U-shaped sections 20 of the detent hook 10 are at a certain distance to the wall of the housing 3 due to the slight tilting of the angled parts 21 to the housing wall, the guide projections 22 extend a corresponding distance with regard to the housing wall in order to form a sufficient adjustment stop 24.

Figure 2A:
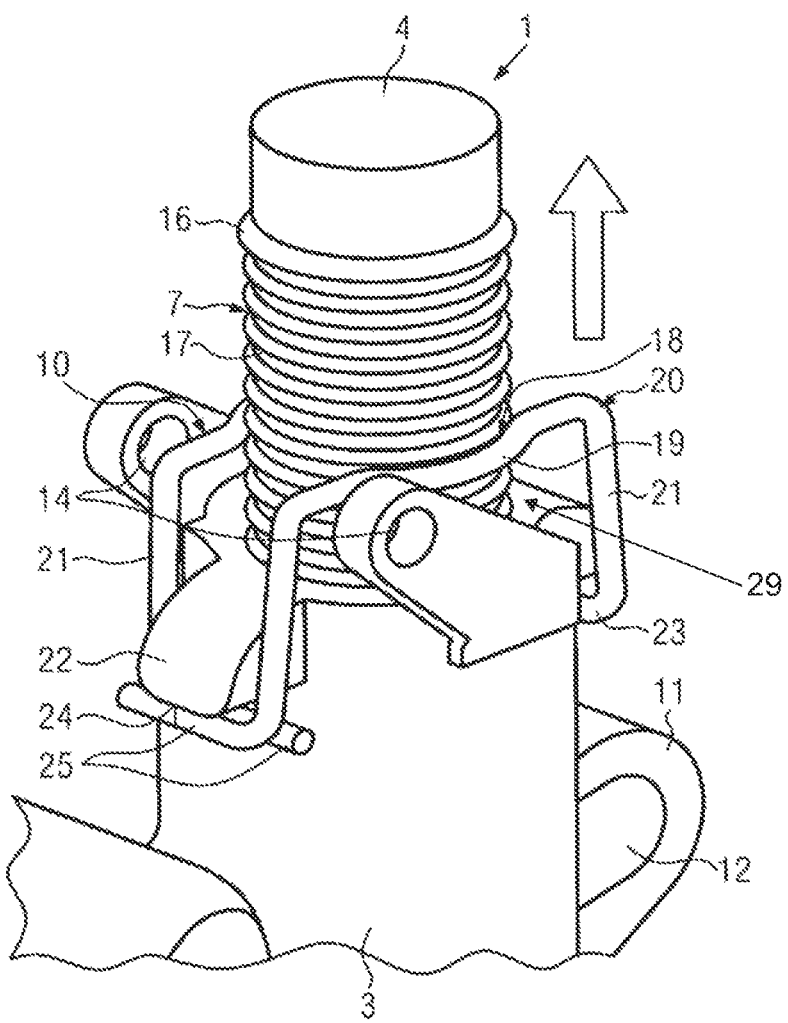
FIG. 2a A partial perspective view of the tensioning system from FIG. 1 with the adjustment device in an extended state.

The tensioning apparatus 1 is shown in a transport safety position which is characterized by the disengaging movement of the tensioning piston 4 being blocked by the safety pin 15 due to the fact that the safety pin 15 held by the safety eyes 14 overlaps with the safety projection 16 at the tensioning piston 4 in FIG. 1. The transport safety lock 13 is deactivated by removing the safety pin 15 from the safety eyes 14, wherein the tensioning apparatus 1 is shifted to an operating position by the tensioning piston 4 disengaging from the housing 3 until it reaches a tensioning position as shown in FIG. 2a. In this procedure, the detent hook 10 is in an abutting state at the adjustment stops 24 of the guide projections 22 during a continuing disengaging movement of the tensioning piston 4 and the arc-shaped clamping sections 19 of the clamping region 18 of the detent hook 10 are spread apart by the rising flanks of the circular grooves 17 shaped like segments of a circle on the tensioning piston 4 against the pretension of the clamping region 18, enabling the tensioning piston 4 to slide through the detent hook 10 until the detent hook 10 re-engages into the next circular groove 17.

As shown in FIG. 2a, this adjustment step occurs several times until the tensioning piston 4 is in an abutting state at a tensioning means which is not shown during the start-up while an adjustment of the working range of the tensioning piston 4 during operation typically only occurs into the respective next circular groove 17 of the detent profiling 7 due to wear of drive components and/or lengthening of the drive means. When adjusting the working range of the tensioning piston 4, the clamping sections 19 spring-elastically connected to each other via the closed U-shaped section 20 facilitate opening the clamping region 18 in reversible radial direction. In that context, an essential part of the curvature occurring between the arc-shaped clamping sections 19 is provided by the torsion of the angled legs 21 of the closed U-shaped section 20 which keeps the actual bending rate of the U-shaped section 20 low and prevents a plastic deformation.

One of the U-shaped legs 20 of the detent hook 10 has a bar 23 consisting of two overlapping free ends 25 which facilitate spreading open the circular clamping region 19 of the detent hook 10 via a relative movement to each other upon a continued disengaging movement of the tensioning piston 4 at its lower end of the angled part 21 for spreading open the arc-shaped clamping sections 19 of the clamping region 18 of the detent hook 10 in this manner when the lower bars 23 of the U-shaped sections 20 are in an abutting state at the adjustment stops 24 of the guide projections 22. Due to the overlap of the free ends 25, the tilting of the individual legs of the associated angled part 21 differs in that context due to the fact that the free ends 25 must reach an abutting state at the adjustment stop 24 of the associated guide projection 22 at the same time for a secure abutting state of the detent hook 10 at the adjustment stops 24 and for spreading apart the arc-shaped clamping sections 19 of the detent hook 10 in a uniform manner.

Figure 2B:
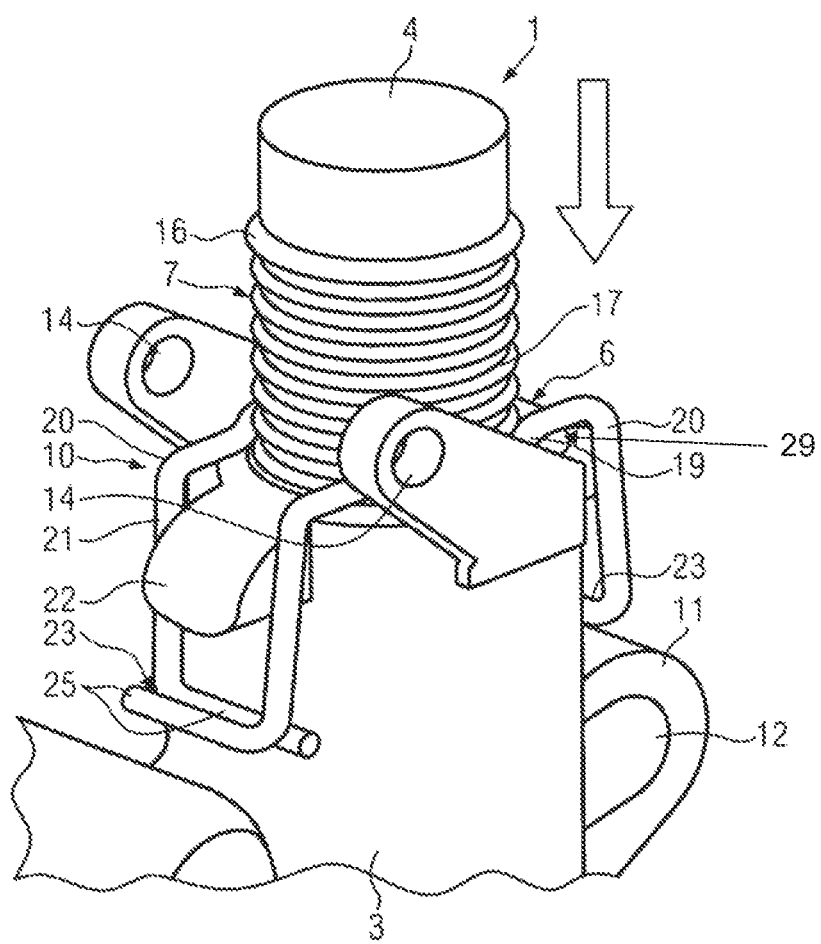
FIG. 2b A partial perspective view of the tensioning system from FIG. 1 with the adjustment device in a retracted state.
Figure 3:
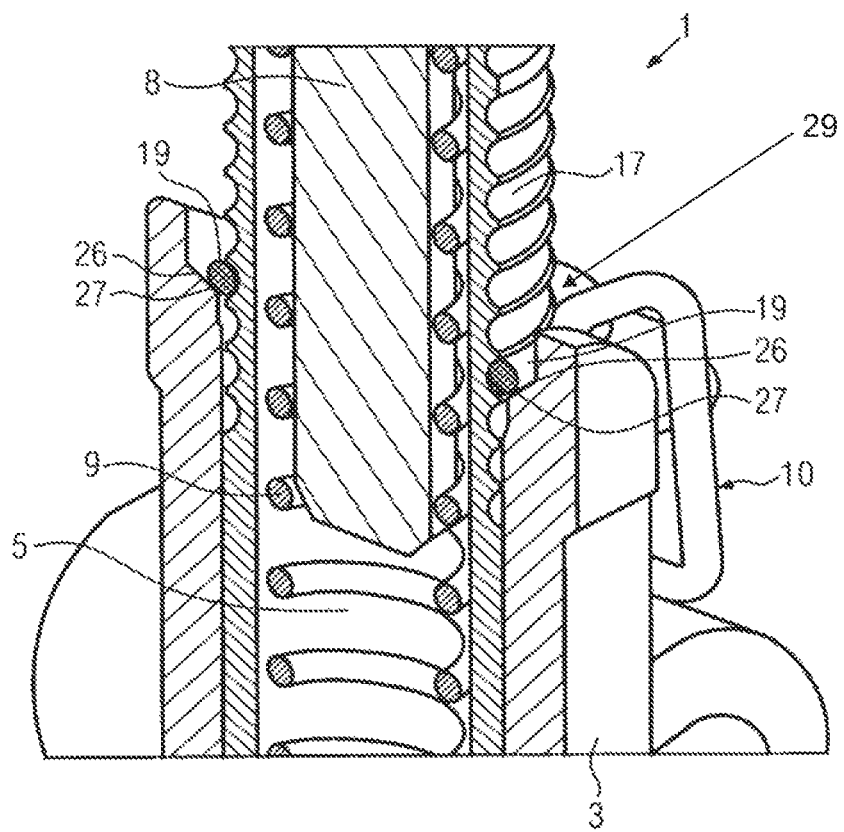
FIG. 3 A sectional view of a part of the tensioning system from FIG. 2b.

During the forceful engaging movement of the tensioning piston 4 into the hollow cylindrical housing 3 shown in FIG. 2b, for example in case of insufficient hydraulic pressure in the pressure chamber 5, the detent hook 10 reaches an abutting state at the retraction stop 26 provided at the tension-side end of the housing 3. This retraction or blocking stop 26 is furnished with a bevel 27 arranged on the inside, into which the circular clamping region 18 of the detent hook 10 engages in such a manner that the U-shaped clamping sections 19 of the detent hook 10 are pressed into the circular groove 17 of the detent profiling 7 of the tensioning piston 4 engaged with the clamping region 18 at that time and a further retraction of the tensioning piston 4 into the housing 3 is reliably blocked during a continued retraction movement of the tensioning piston 4 into the housing 3. The blocking stop 26 on the face-side end of the housing 3 only extends over the range of the two clamping sections 19 of the clamping region 18 of the guided detent hook 10 in that context. The region of the tension-side end of the housing 3 which is assigned to the U-shaped legs 20 has been cut clear on the opposite side in order to avoid a negative influence on the clamping and blocking effect of the clamping region 18 at the blocking stop 26.

The operating situations shown in FIGS. 2a and 2b, the abutting state of the detent hook 10 at the adjustment stops 24 of the guide projections 22 and the abutting state of the detent hook 10 at the face-side blocking stop 26 of the housing 3, define the dynamic operating range of the tensioning apparatus 1 by virtue of the tensioning piston 4 being hydraulically damped over this free duty stroke. The tensioning piston 4 is axially guided and secured against twisting via the detent hook 10 which is fastened by the arc-shaped clamping sections 19 in the detent profiling 7 in that context. The breakthrough of occurring force peaks, for example during the start-up procedure of an internal combustion engine, is prevented by avoiding the uncontrolled engaging movement of the tensioning piston 4 by fixing the detent hook 10 at the blocking stop 26. This also reliably avoids jumping of an associated drive means on the respective driving wheels, in particular if the pressure chamber 5 of the tensioning apparatus 1 has not yet been completely filled with a hydraulic medium.

FIGS. 4a and 4b show the restoring action of the tensioning piston 4 of the tensioning apparatus 1 in a tensioning system with restoring action as described in the invention. A restoring element 28 is initially positioned between the restoring receptacle 29 at the housing 3 above the guide projection 22 and the detent hook 10 as shown in FIG. 4a. The tensioning piston 4 must be in its dynamic operating range to that end, resulting in the detent hook 10 not being in an abutting state at the retraction or blocking stop 26. Depending on the position of the restoring receptacle 29, a small distance between the detent hook 10 and the blocking stop 26 may already be sufficient to insert the restoring element 28 between the restoring receptacle 29 and the detent hook 10 and to activate the restoring device 2. The tip of the restoring element 28 may have a beveled, pointed, or cone-shaped design in order to simplify inserting the restoring element 28.

The restoring element 28 positioned in the restoring receptacle 29 prevents the detent hook 10 from reaching an abutting state at the blocking stop 26 via manual pressure or a mechanical force introduction during an engaging movement of the tensioning piston 4, but fastens the detent hook 10 in a position at a distance to the blocking stop 26 in such a manner that the clamping sections 19 of the clamping region 18 of the detent hook 10 are not pressed into the circular grooves 17 of the detent profiling 7. Upon a further engaging movement of the tensioning piston 4, the arc-shaped clamping sections 19 of the detent hook 10 are spread apart by the rising flanks of the circular grooves 17 shaped like segments of a circle on the tensioning piston 4, wherein the free ends 25 of the bar 23 of the free U-shaped leg 20 of the detent hook 10 also move to the outside here in order to facilitate spreading open the clamping region 18. Spring-elastically spreading open the circular clamping region 18 of the detent hook 10 via the elastic curvature of the closed U-shaped section 20 allows the tensioning piston 4 to slide through the detent hook 10 in the respective next circular groove 17 in force direction to the safety projection 16 of the transport safety lock 13 and consequently to fully restore the tensioning piston 4 into its transport and assembly position, ref. FIG. 4b.

If the detent hook 10 has once again been restored in the first circular groove 17 of the detent profiling 7 at the tensioning piston 4 below the safety projection 16 by means of the restoring device 2, the tensioning piston 4 may be held in this position characterized by being retracted in the housing 3 with manual force or a mechanical fastening means in order to again remove the restoring element 28 from the restoring receptacle 29. As only the elastic force of the compression spring 9 must be held and/or overcome without operating pressure of the hydraulic medium in the pressure chamber 5 in this context, the manual finger or hand force of the technician may be sufficient under normal circumstances. After that, the safety pin 15 of the transport safety lock 13 may be pushed through the safety eyes 14 formed at the housing 3 in order to overlap with the safety projection 16 at the tensioning piston 4. To that end, the tensioning piston 4 may need to be inserted together with the detent hook 10 a bit further into the housing 3 in order to move the safety pin 15 past the safety projection 16 into the transport position. As the restoring element 28 typically must be removed from the restoring receptacle 29 prior to inserting the safety pin 15 in order to bring the tensioning piston 4 together with the detent hook 10 into the transport position, i.e. into an abutting state at the blocking stop 28, the safety pin 15 may also be used as restoring element 28 without disadvantages.

The invention claimed is:

1. A tensioning system with restoring action for tensioning a flexible drive means, in particular a drive chain of an internal combustion engine, comprising a tensioning apparatus and a restoring device; the tensioning apparatus comprising a housing, a tensioning piston which is guided in a movable manner in tensioning direction in the housing and which has a detent profiling, and a detent hook for the stepped adjustment of the working range of the tensioning piston, wherein the detent hook has a clamping region for engaging into the detent profiling at the tensioning piston, and wherein a retraction stop is provided at the housing in such a manner that in an abutting state of the detent hook, a further retraction movement of the tensioning piston into the housing is prevented by virtue of the clamping region being clamped on the detent profiling, wherein a restoring receptacle is formed at the housing of the tensioning apparatus and the restoring device has a restoring element for coupling to the tensioning apparatus, wherein the restoring element positioned in the restoring receptacle between the restoring receptacle and the detent hook prevents the abutting state of the detent hook at the retraction stop and wherein the restoring element facilitates automatically spreading open the clamping region and restoring the tensioning piston upon the detent hook being in the abutting state at the restoring element and a further retraction movement of the tensioning piston into the housing.

2. The tensioning system in accordance with claim 1, wherein the detent profiling is formed at the tensioning piston in such a manner that it is possible to automatically spread open the clamping region when restoring the tensioning piston.

3. The tensioning system in accordance with claim 1, wherein the restoring receptacle has a support surface and a safety projection protruding opposite the support surface.

4. The tensioning system in accordance with claim 1, wherein the restoring element is pin-shaped and at least partially complementary to the restoring receptacle.

5. The tensioning system in accordance with claim 1, wherein the detent hook has a section that radially extends from the tensioning piston to the outside, wherein the section of the detent hook that extends to the outside is in the abutting state at the restoring element when restoring the tensioning piston and facilitates spreading open the clamping region upon a further retraction movement of the tensioning piston.

6. The tensioning system in accordance with claim 5, wherein the clamping region of the detent hook has two clamping sections and the section radially extending to the outside forms at least one part of a U-shaped section of the detent hook that spring-elastically connects the clamping sections.

7. The tensioning system in accordance with claim 6, wherein the U-shaped section of the detent hook has at least one angled part and the housing has at least one guide projection that protrudes from the housing wall, wherein the guide projection axially guides the angled part of the U-shaped section of the detent hook and secures it against twisting in the working range of the tensioning piston.

8. The tensioning system in accordance with claim 7, wherein the guide projection is at least partially arranged between the parallel legs of the angled part of the U-shaped section of the detent hook, wherein the guide projection forms a stop at its rear end that limits the axial movement of the detent hook in the disengaging direction of the tensioning piston.

9. The tensioning system in accordance with claim 1 wherein the detent hook is manufactured from a round wire.

10. The tensioning system in accordance with claim 1, wherein the detent profiling at the tensioning piston is formed as channel profile with multiple detent channels.

11. The tensioning system in accordance with claim 10, wherein the detent channels have slanted flanks on both sides, wherein spreading open the detent hook via the detent profiling at the tensioning piston when adjusting the working range of the tensioning piston and when restoring the tensioning piston is facilitated by means of the slanted flanks on both sides.

12. The tensioning system in accordance with claim 10, wherein the detent profiling at the tensioning piston is formed as channel profile with circumferential detent channels.

13. The tensioning system in accordance with claim 1, wherein a transport safety lock with a safety pin is provided, wherein at least one pin receptacle suitable for receiving the safety pin in order to hold the tensioning piston in a transport position is provided at the housing.

14. The tensioning system in accordance with claim 13, wherein the safety pin may be used as restoring element.

\* \* \* \* \*